United States Patent [19]

Lazar

[11] 4,101,062

[45] Jul. 18, 1978

[54] INFLATABLE CARTOP CARRIER AND SHELTER STRUCTURE

[76] Inventor: Benjamin E. Lazar, 5446 Cheena Dr., Houston, Tex. 77096

[21] Appl. No.: 772,809

[22] Filed: Feb. 28, 1977

[51] Int. Cl.² .............................................. B62D 33/04
[52] U.S. Cl. ............................ 296/37.7; 296/23 R; 296/26; 224/42.1 R
[58] Field of Search ..................... 296/23 R, 23 C, 26, 296/39, 101, 37.7, 39 R, 29; 224/42.1 R, 42.1 B

[56] References Cited

U.S. PATENT DOCUMENTS

| | | | |
|---|---|---|---|
| 3,433,470 | 3/1969 | Erke | 296/10 |
| 3,653,710 | 4/1972 | Barnard | 296/39 R |
| 3,802,732 | 4/1974 | McKee | 296/23 R |

Primary Examiner—Richard A. Bertsch
Attorney, Agent, or Firm—Michael P. Breston

[57] ABSTRACT

The inflatable structure is adapted to serve as a cartop carrier for securely and conveniently carrying, sheltering, and storing objects therein when inflated, and to collapse into a small volume when not in use.

6 Claims, 12 Drawing Figures

U.S. Patent  July 18, 1978  Sheet 1 of 2  4,101,062
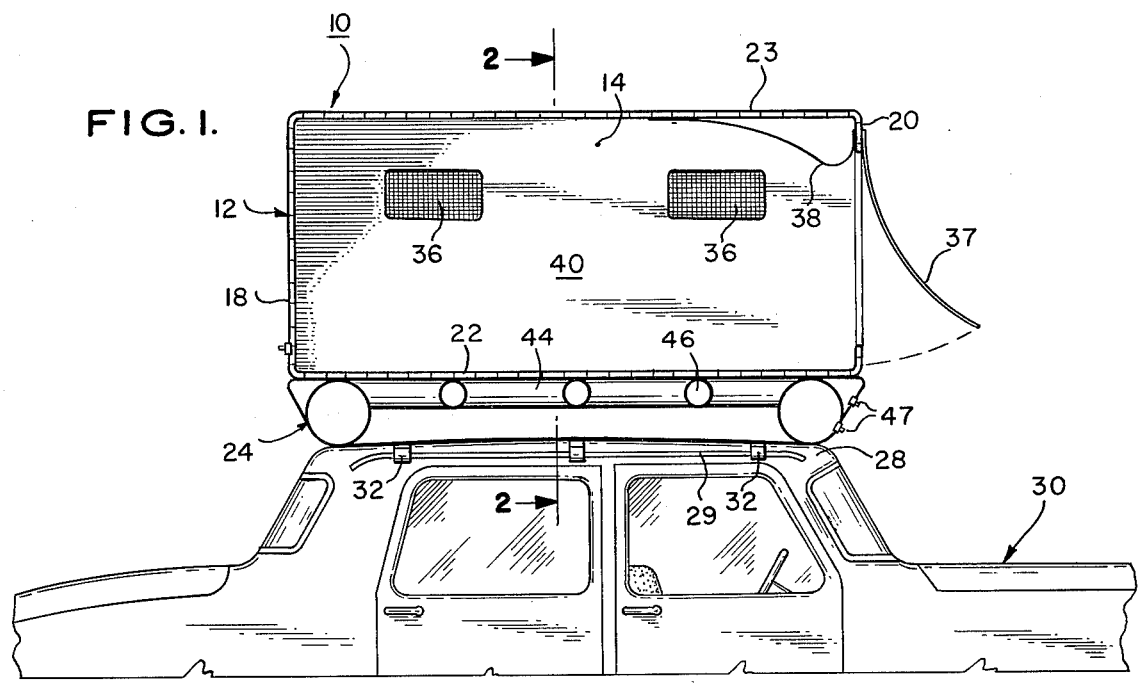
FIG. 1.
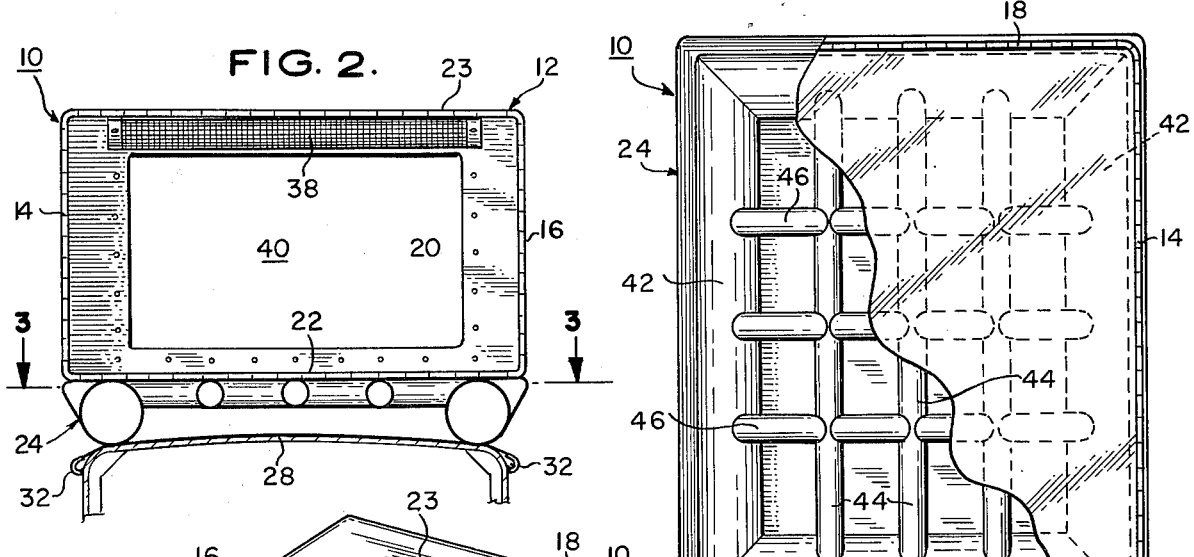
FIG. 2.
FIG. 3.
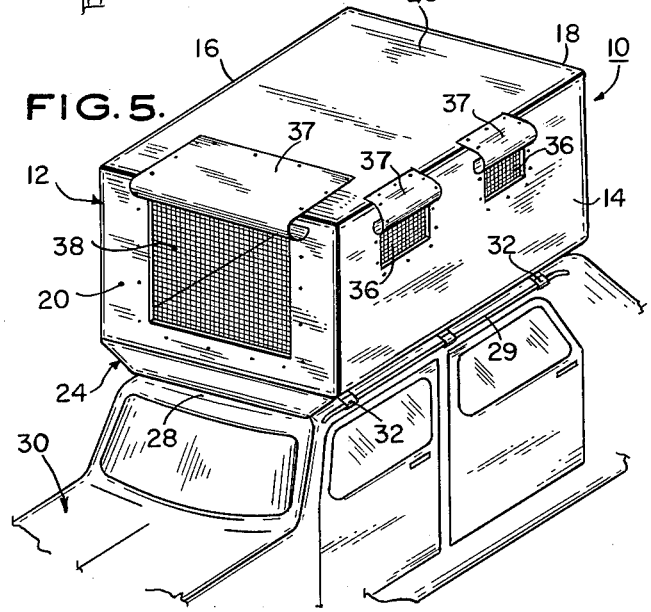
FIG. 5.
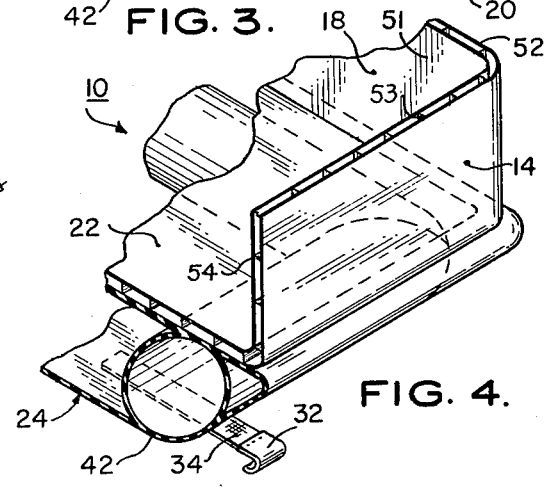
FIG. 4.

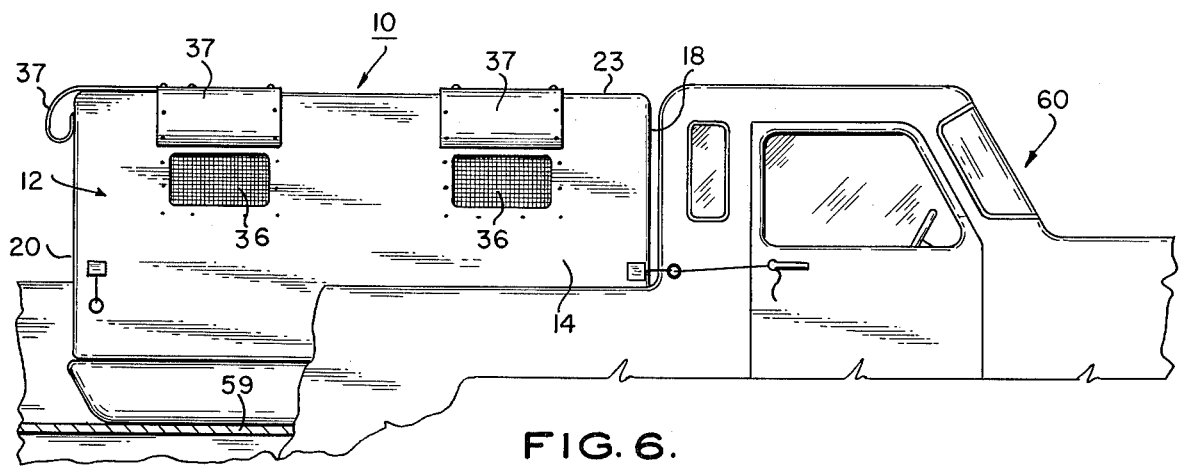
FIG. 6.
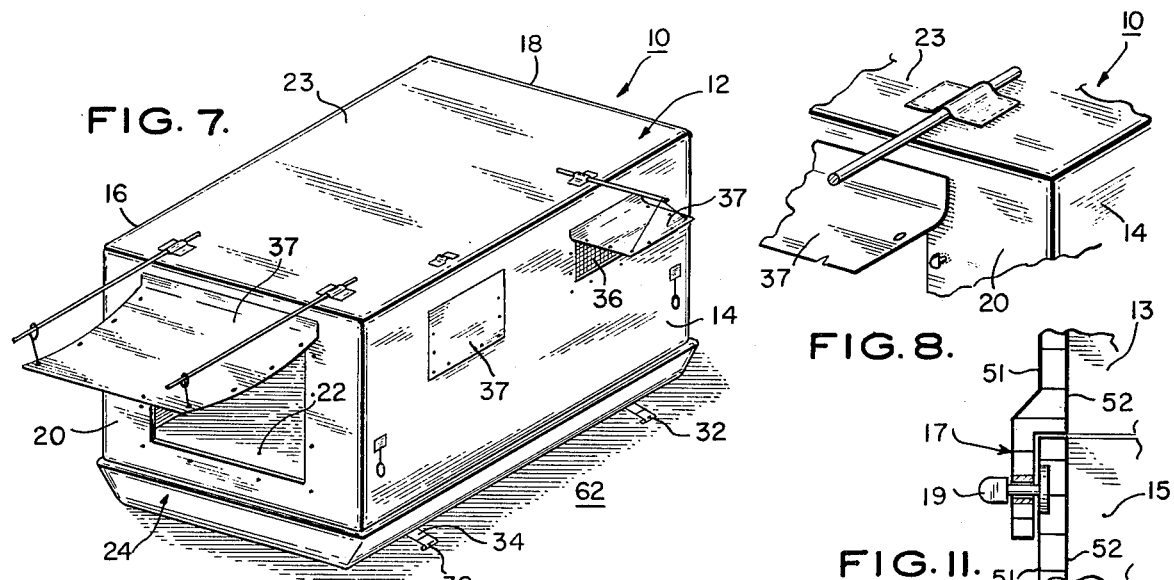
FIG. 7.
FIG. 8.
FIG. 11.
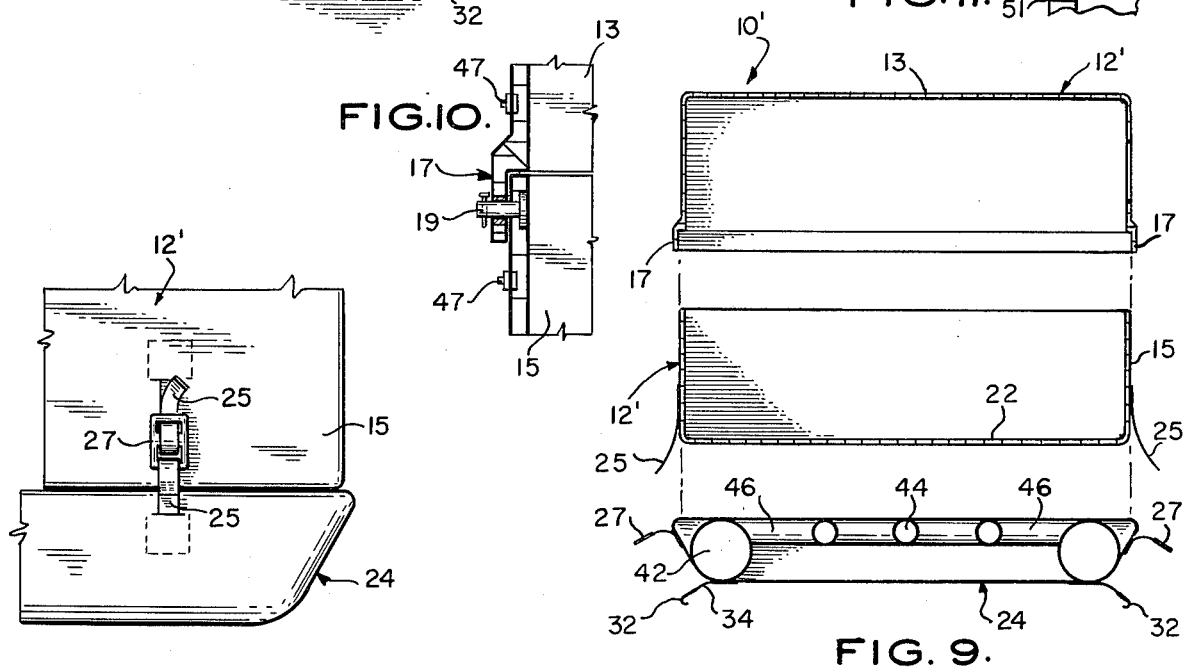
FIG. 10.
FIG. 12.
FIG. 9.

INFLATABLE CARTOP CARRIER AND SHELTER STRUCTURE

BACKGROUND OF THE INVENTION

1. Field of the Invention

This invention relates to cartop carriers and especially to such carriers which are collapsible, and which can also serve as shelters for camping, etc.

2. Brief Description of the Prior Art

Cartop carriers are widely used for carrying objects such as camping equipment. Many patents have been issued on such cartop carriers, including the collapsible variety and the carrier-shelter combination. The known cartop carriers have several drawbacks. For example, they cannot be collapsed into a small space, they are relatively heavy, and they are in need of frequent repair.

Applicant has departed from such conventional structures and has provided a lightweight, fully collapsible structure for cartop carriers which is inflatable, which is relatively strong, and which can find multi-uses both as a case and as a shelter.

SUMMARY OF THE INVENTION

The invention provides an inflatable structure which is adapted to serve as a cartop carrier case having a chamber therein for carrying objects securely and conveniently when inflated. The structure is collapsible into a small space when not in use. The structure includes a top or roof, an inflatable, horizontally-disposed mattress, and front, rear, and side walls extending between the mattress and roof. An inflatable support platform is horizontally-disposed underneath the mattress and is adapted to distribute concentrated loads from the mattress over the car top so that the pressure intensity on the car is nowhere more than the acceptable amount. When the carrier case is designed for carrying relatively large loads, the support platform is fabricated with an outer large-diameter air tube at the edge thereof, and with a plurality of longitudinal and lateral inner air tubes interlinking the outer air tube for reinforcing the platform.

BRIEF DESCRIPTION OF THE DRAWINGS

FIG. 1 is a front view of one embodiment of the inflatable carrier shown mounted over a car top;

FIG. 2 is a view along line 2—2 in FIG. 1;

FIG. 3 is a view along line 3—3 in FIG. 2;

FIG. 4 is a fragmentary view, partly in section, illustrating a method of construction of the inflatable structure;

FIG. 5 is a view in perspective of the structure shown in FIG. 1;

FIG. 6 shows the inflatable carrier mounted on the bed of a truck;

FIG. 7 illustrates the use of the structure as a tent;

FIG. 8 is an enlarged fragmentary view in perspective of a corner of the structure shown in FIG. 7;

FIG. 9 is a sectional view, similar to FIG. 2, illustrating another embodiment of the invention;

FIG. 10 is an enlarged detail view of the securing means for the embodiment shown in FIG. 9;

FIG. 11 is similar to FIG. 10 illustrating a different embodiment of the securing means; and FIG. 12 is a fragmentary enlarged view of the coupling means for securing the inflatable case to the support platform.

DESCRIPTION OF THE PREFERRED EMBODIMENTS

Referring to FIGS. 1-8 wherein like reference numerals designate the same or similar parts, there is illustrated an inflatable structure, generally designated as 10. In a simplified embodiment, the structure comprises a case 12 having a front wall 14, a rear wall 16, and side walls 18, 20. The upstanding walls are between a horizontally-disposed bottom mattress 22 and a top or roof 23. Positioned underneath the air mattess 22 is a cushion or platform, generally designated as 24.

Structure 10 is adapted to be carried on the top 28 of a vehicle, generally designated as 30. Platform 24 has suitable hooks 32, at the terminals ends of straps 34 welded to the bottom side of platform 24, for engagement with the dip rail 29 of the car's top 28. The straps 34 are pulled down tightly so that the hooks engage with the roof on the vehicle in a secure and conventional manner.

The case 12 can further include plastic windows 36 and awnings 37 therefor, as well as screen doors 38. The awnings protect the inner chamber 40 of case 12 against rain.

The function of platform 24 is to distribute concentrated loads from the mattress 22 over the car top 28 so that the pressure intensity on the cartop is nowhere more than the acceptable amount. Should such concentrated loads be excessive, platform 24 can be provided with an air tube structure having a relatively-large diameter outer air tube 42, reinforced by longitudinal inner tubes 44 and lateral inner tubes 46, all preferably but not necessarily in air communication with each other. Conventional air valves 47 are provided for inflating and deflating the air structure 10, as shown.

It will also be apparent that the air-inflated structure 10 is suitable for erection on any flat or curved surface. For example, structure 10 in addition to being suitable for erection on a cartop to serve as a luggage carrier, can also be erected over the bed 59 (FIG. 6) of a pick-up truck 60, or it can be erected over ground 62 (FIG. 7) to serve as a tent for shelter. Other uses for the structure 10 of this invention will readily become apparent.

The construction of structure 10 will be apparent from an inspection of FIG. 4 wherein each wall consists of two plastic panels or sheets 51, 52 having suitable vertical and horizontal spacers 53, 54, respectively, therebetween. The structure 10 can be made from strong, durable, air and watertight material such as, for example, HYPALON, a trademark of Dupont. Any other flexible, thin, strong air tight and watertight material would also be suitable. The bottom sheet 52 of the mattress 22 can be made to serve as the top sheet of the platform 24, as best shown in FIG. 4. The entire structure can be fabricated by overlapping the wall sheets around the mattress sheet and welding them in any conventional manner to the mattress. In a simmilar manner, the roof sheets may be overlapped around the wall sheets and tightly welded thereto. An overlapped welding can also be used for the construction of the front, rear and side walls. The overlapping can take place at one or more wall corners. Any other fabrication method for the structure can be suitably employed.

The roof 23 may be designed parallel to the horizontal mattress 22 or it may have a sloped or pitched shape, if desired. Also, the walls may be vertical or inclined.

The platform reinforced with air tubes will allow the larger-diameter, outer air tube 42 to transfer the load carried by mattress 22 directly to the perimeter of the supporting cartop 28.

The air inflatable structure can be fabricated so as to have a single common air chamber between the inner and outer sheets 51, 52 or it may be provided with as many air chambers as desired or as may be required by the fabrication and/or by the erection process. During vehicle movement, the structure can be slightly deflated if desired so that the entire assembly will be somewhat flattened out in order to decrease the wind resistance offered by the vehicle.

With reference now to another embodiment 10' of the invention, as shown in FIGS. 9–12, the modificaion resides in constructing the case 12' from an upper section 13 and a lower section 15 having a peripheral joint 17 therebetween. The sections can be secured to each other in overlapping fashion by hand-operated keys 19, as shown in FIGS. 10, 11. In this embodiment, the air mattress 22 is distinct and separate from its support cushion and is secured thereto by suitable belts 25 and buckles 27. Air mattress 22 can form an integral part with platform 24 as previously described in connection with FIG. 4.

Various other modifications will readily suggest themselves to those skilled in the air and all such are intended to fall within the scope of the appended claims.

What is claimed is:

1. An inflatable structure having a cartop carrier case forming a chamber therein for securely and conveniently carrying, storing and sheltering objects when said structure is inflated, and to collapse into a small space when not in use,
    wherein, said structure includes:
    an inflatable horizontally-disposed bottom mattress, a roof, and front, rear and side walls extending between said mattress and said roof.

2. The structure of claim 1, and
    an inflatable support platform horizontally-disposed underneath said mattress, said platform being adapted to distribute concentrated loads from said mattress over the cartop, so that the pressure intensity on the car is nowhere more than the acceptable amount.

3. The structure of claim 2, wherein said platform contains a plurality of reinforcing air tubes.

4. The structure of claim 3 wherein said air tubes include an outer relatively large-diameter air tube disposed around the perimeter of said mattress, and a plurality of small diameter inner air tubes interlinking with said outer air tube.

5. An inflatable structure having an inflatable bottom support and an inflatable cartop carrier case extending upwardly from said support, said case having a roof, and front, rear and side walls extending between said support and said roof, and forming a chamber therein for carrying, storing and sheltering objects when said structure is inflated, and to collapse into a small space when not in use.

6. The inflatable structure of claim 5, wherein said case is detachably secured to said support, and said support has means for attaching said structure to a cartop.

* * * * *